(12) United States Patent
Hu et al.

(10) Patent No.: US 9,491,683 B2
(45) Date of Patent: Nov. 8, 2016

(54) MOBILE NETWORK WITH SOFTWARE DEFINED NETWORKING ARCHITECTURE

(71) Applicant: AT&T Intellectual Property I, L.P., Atlanta, GA (US)

(72) Inventors: Qingmin Hu, Sammamish, WA (US); Farooq Bari, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 81 days.

(21) Appl. No.: 14/530,502

(22) Filed: Oct. 31, 2014

(65) Prior Publication Data
US 2016/0127975 A1 May 5, 2016

(51) Int. Cl.
*H04W 40/00* (2009.01)
*H04W 40/02* (2009.01)

(52) U.S. Cl.
CPC .................................. *H04W 40/02* (2013.01)

(58) Field of Classification Search
CPC ........................................................ H04W 4/02
USPC .................... 455/445, 432.3, 432.1
See application file for complete search history.

(56) References Cited

U.S. PATENT DOCUMENTS

| | | | | |
|---|---|---|---|---|
| 6,822,940 B1 * | 11/2004 | Zavalkovsky | .......... | H04L 47/10 370/235 |
| 6,959,006 B1 * | 10/2005 | Sarnikowski | ....... | H04L 41/0803 370/468 |
| 7,539,747 B2 * | 5/2009 | Lucovsky | ............. | G06F 21/335 709/217 |
| 7,636,324 B2 * | 12/2009 | Nassar | ................... | H04L 41/08 370/254 |
| 8,448,238 B1 * | 5/2013 | Gupta | .................. | H04L 67/327 726/15 |
| 8,521,905 B2 * | 8/2013 | Beliveau | ............... | H04L 67/327 370/224 |
| 8,620,309 B2 * | 12/2013 | Hu | ....................... | H04W 28/24 455/343.2 |
| 8,711,860 B2 * | 4/2014 | Beliveau | ............... | H04L 67/327 370/392 |
| 8,799,990 B2 * | 8/2014 | Hu | ...................... | H04L 63/0227 726/1 |
| 8,804,511 B2 * | 8/2014 | Hu | ........................ | H04L 47/805 370/230 |
| 8,923,853 B1 * | 12/2014 | Shaw | ..................... | H04W 8/12 455/432.1 |
| 8,964,647 B2 * | 2/2015 | Hu | ........................ | H04W 88/16 370/328 |
| 9,143,531 B2 * | 9/2015 | Hu | .......................... | H04L 63/20 |
| 9,179,007 B1 * | 11/2015 | Yadav | ................... | H04M 15/66 |
| 9,241,305 B2 * | 1/2016 | Cui | ...................... | H04W 48/18 |
| 9,271,188 B2 * | 2/2016 | Hu | ........................ | H04W 28/18 |
| 2002/0143948 A1 * | 10/2002 | Maher, III | .......... | H04L 47/2441 709/226 |
| 2007/0118881 A1 * | 5/2007 | Mitchell | ............... | H04L 63/102 726/4 |
| 2012/0204224 A1 * | 8/2012 | Wang | .................. | H04L 67/2819 726/3 |
| 2013/0301415 A1 * | 11/2013 | Archer | .................. | H04W 28/08 370/235 |
| 2015/0105049 A1 * | 4/2015 | Golaup | ............... | H04L 63/0892 455/411 |
| 2015/0295808 A1 * | 10/2015 | O'Malley | ............... | H04L 47/22 709/224 |
| 2016/0044035 A1 * | 2/2016 | Huang | ................ | H04L 63/0272 726/4 |

* cited by examiner

*Primary Examiner* — Marceau Milord
(74) *Attorney, Agent, or Firm* — Amin, Turocy & Watson, LLP (57) ABSTRACT

A network core with a software defined networking ("SDN") controller is provided to control routing of traffic within the network and between the network and the traffic destination. The SDN controller is merged with existing $3^{rd}$ Generation Partnership Project ("3GPP") network architecture to enable service deliveries via open application programming interfaces ("APIs") and move the network core towards an all internet protocol ("IP"), cloud based, and software driven telecom network. The SDN controller can work with, or take the place of policy and charging rules function ("PCRF") network elements, so that policies such as quality of service and traffic management and routing can be synchronized and managed end to end.

20 Claims, 10 Drawing Sheets

MOBILE NETWORK WITH SOFTWARE DEFINED NETWORKING ARCHITECTURE

TECHNICAL FIELD

The subject disclosure relates to interworking and convergence of policy and charging control of a mobile network with software defined networking architecture.

BACKGROUND

Widespread proliferation of wireless broadband networks offers increased quality of experience for mobile users, but also renders management and maintenance of these networks a tedious and costly task. The network core, which facilitates mobile management and data transfer is traditionally comprised of individual server elements with each piece of hardware performing a dedicated task. Several of the server elements perform control plane functions of managing subscription information, traffic management and data routing. This routing can be complex and unique to each mobile network architecture, requiring additional time to set up and test the configuration.

DETAILED DESCRIPTION

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

A network core with a software defined networking ("SDN") controller is provided to control routing of traffic within the network and between the network and the traffic destination. The SDN controller is merged with existing $3^{rd}$ Generation Partnership Project ("3GPP") network architecture to enable service deliveries via open application programming interfaces ("APIs") and move the network core towards an all internet protocol ("IP"), cloud based, and software driven telecom network. The SDN controller can work with, or take the place of policy and charging rules function ("PCRF") network elements so that policies such as quality of service ("QoS") and traffic management and routing can be synchronized and managed end to end.

An LTE network is a policy-based traffic management architecture with a PCRF element traditionally controlling the QoS levels and other information (priorities bandwidths, etc.) that manages IP flows that carries a particular application (such as voice, video, messaging, etc.). This policy based mechanism applies to the IP traffic between the mobile device and the packet data network gateway ("PGW"). In an embodiment of the subject disclosure, software defined networking can be used to provide routing and traffic control for packets sent from the PGW to a destination address. In some embodiments, the SDN controller can also provide traffic control for packets from the mobile device to the destination in some embodiments.

The PCRF and the SDN controller can also communicate about some aspects of a particular application flow so that routing decisions both in the access network (between eNodeB and PGW) as well as in the backbone can be made based on the nature of the application and how that particular flow was expected to be treated based on operator policies and user subscription. For example, if a higher QoS is to be applied to a traffic flow carrying voice packet, the service related information such as QoS can be used by SDN controller to make decisions such as mapping and route optimizations. This will enable the entire network to be application aware with a consistent treatment of the packets.

In an embodiment, some policies may be directly communicated with both PCRF and the SDN controller so a common set of policies about a particular traffic treatment can be applied. In addition, in another embodiment a common charging rule or keys can be applied to the end to end traffic.

For these considerations as well as other considerations, in one or more embodiments, a system includes a processor and a memory that stores executable instructions that when executed by the processor, facilitate performance of operations, including determining service profile information associated with a mobile device based on policy information stored in a policy data store. The operations can include managing a control plane function for data received from the mobile device based on the service profile information, wherein the managing the control plane function is facilitated by a software defined networking controller performing a first traffic management function on a first set of data received by a packet data network gateway device and performing a second traffic management function on a second set of data transmitted by the packet data network gateway device.

In another exemplary embodiment a system can include a processor, and a memory that stores executable instructions that, when executed by the processor, facilitate performance of operations. The operations can include determining service profile information associated with a mobile device based on policy information stored in a policy data store. The operations can also include facilitating a control plane function for data received from the mobile device based on the service profile information, wherein the facilitating the control plane function uses a policy charging and rules function element that performs a first traffic management function on a first set of data being determined to have been received by a packet data network gateway device and, using a software defined networking controller, performs a second traffic management function on a second set of data being determined to have been transmitted by the packet data network gateway device, wherein the software defined networking controller performs the second traffic management function based on a communication received from the policy charging and rules function element.

In another example embodiment a method can comprise determining, by a device comprising a processor, service profile information associated with a mobile device based on policy information stored in a policy data store. The method can also comprise initiating, by a policy charging and rules function network element, a first traffic management function to be performed on a first set of data sent from a mobile device and determined to have been received at a packet data network gateway device, wherein the first traffic management function is based on the service profile information. The method can also include facilitating, by a software defined networking controller, a second traffic management function to be performed on a second set of data determined to have been transmitted from the packet data network gateway device, wherein the second traffic management function is based on the first traffic management function and the policy charging and rules function network element and the software defined networking controller coordinate with each other based on the service profile information.

Figure 1:
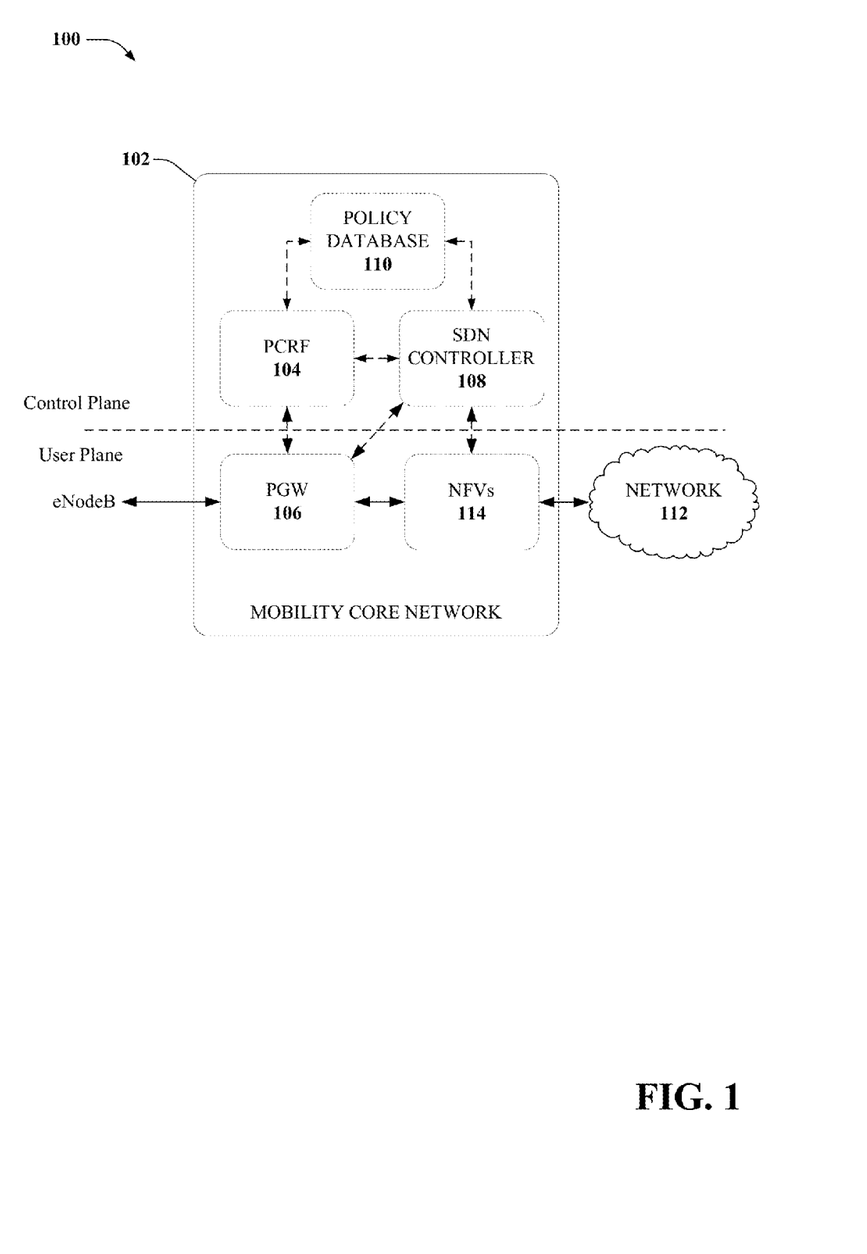
FIG. 1 is an example, non-limiting embodiment of a block diagram showing a mobile network architecture with a software defined networking (SDN) controller in accordance with various aspects described herein.

Turning now to FIG. 1, illustrated is a block diagram showing a mobile network architecture 100 with a software defined networking (SDN) controller 108 in accordance with various aspects described herein.

A mobile broadband network generally comprises a radio access network that facilitates communications between the mobile devices and a core network 102. In the case of LTE networks and other 3GPP compliant networks (e.g., LTE Advanced) and even non-3GPP systems such as WiMAX and CDMA2000, these networks are the radio access network which communicates directly with a mobile device, and a core network 102 that contains a series of components that provide mobile data and control management. A packet data network gateway PGW 106 can receive packets or other data transmissions from one or more Evolved Node Bs that are the hardware that is connected to the mobile phone network that communicates directly with mobile devices. The PGW 106 can receive packets from the eNodeB via a serving gateway ("SGW") (not shown) that is provided to route and forward data packets received from the mobile devices while PGW 106 is provided to facilitate connectivity between the mobile devices and the external packet data networks 112. A PCRF 104 can be provided to perform control and management of the packets traveling in the user plane between the mobile devices and the PGW 106. The PCRF 104 can apply rules and policies based on user related information and subscription material available in a policy database 110.

In an embodiment the SDN controller 108 can then provide control and management of the packets or data sent from PGW 106 to external packet network 112. SDN controller 108 can receive information relating to the rules and policies associated with data transmission sent to and from the relevant mobile device from policy database 110, and PCRF 104 can handoff control and management of the data traffic to the SDN controller 108. In an embodiment, if there are one or more network function virtualization ("NFVs") in the mobility core network 102, SDN controller 108 can handle the control plane functions related to traffic sent to and from one or more of the NFVs 114. Such NFVs can include virtualized elements such as virtualized SGWs, virtualized PGWs, and other virtualized network elements.

In an embodiment, the PCRF 104 and the SDN controller 108 can perform traffic management functions such as route modification for transmission routes of data sent to the external packet network 112 and Differentiated Services Code Point ("DSCP") mapping based on the service related information such as QoS. In an embodiment, the traffic management functions performed by the PCRF 104 or the SDN controller 108 on a first set of data received at a PGW 106 sent from a mobile device include routing data based on subscription information associated with profile information about the mobile device or a user account associated with the mobile device. The routing data can include classifying a packet classification and performing route optimization. In another embodiment, the SDN controller 108 can perform a second traffic management function on traffic between the PGW 106 and the external packet network 112 including quality of service control based at least in part on subscription information associated with profile information associated with the mobile device. The quality of service control can also be based on an application associated with the packets of data. For instance, if a set of data is related to voice applications, the packet can have a specified QoS defined by the policy database 110, and SDN controller 108 and PCRF 104 can ensure that the packet is managed accordingly.

Figure 2:
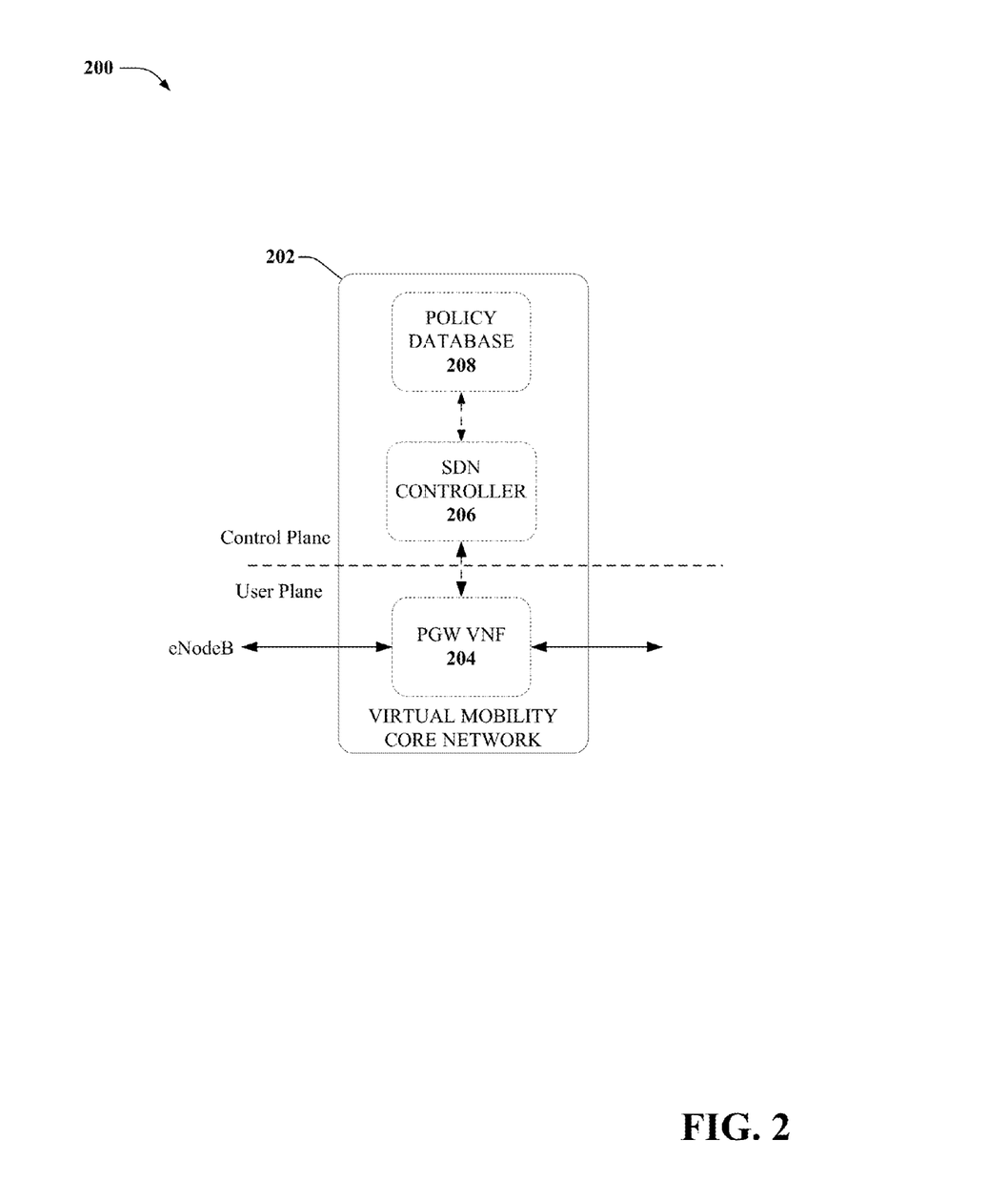
FIG. 2 is an example, non-limiting embodiment of a block diagram showing a mobile network architecture with an SDN controller and networking function virtualization element in accordance with various aspects described herein.

Turning now to FIG. 2 illustrated is an example, non-limiting embodiment of a block diagram 200 showing a mobile network architecture with an SDN controller 206 and networking function virtualization element 204 in accordance with various aspects described herein.

In the embodiment, shown in FIG. 2, all of the core network elements in the user plane are virtualized elements, e.g., network function virtualizations, in this case, the packet data network gateway virtual network function 204. PGW VNF 204 performs the same or similar tasks such as a regular PGW, (e.g., route and transmit packets from a mobile device, via the eNodeB, to an external packet network.) but the PGW VNF 204 is not a physical server element, but resides in software or in the cloud. Accordingly, SDN controller 206 can provide the traffic management for data sent to and from the PGW VNF 204.

In the control plane, SDN controller 206 can provide traffic management control for packets received from the mobile device via the eNodeB at the PGW VNF 204, and can also provide traffic management for packets forwarded on to other NFVs or the external packet network. The SDN controller 206 can apply rules and policies based on user related information and subscription material available in a policy database 208.

Figure 3:
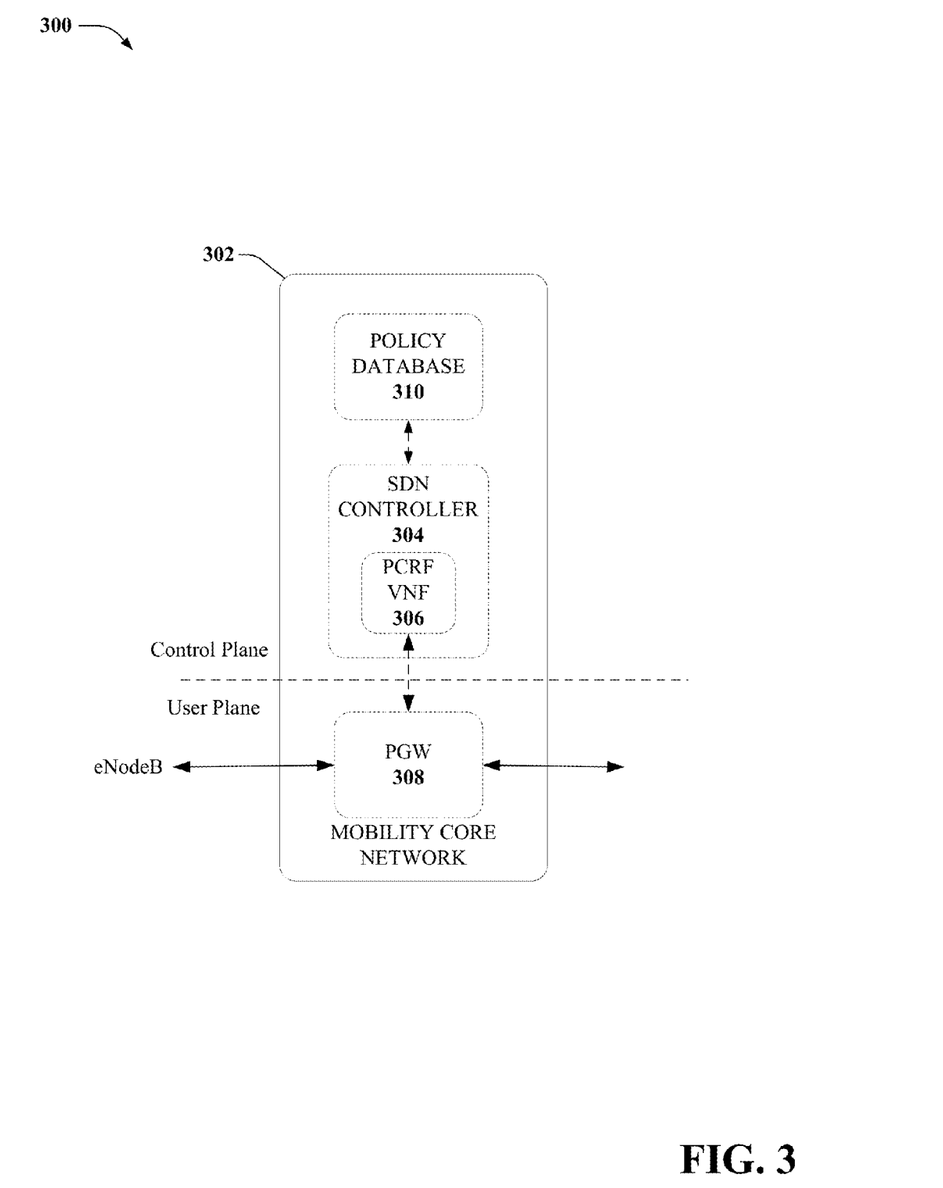
FIG. 3 is an example, non-limiting embodiment of a block diagram showing a mobile network architecture with an SDN controller in accordance with various aspects described herein.

Turning now to FIG. 3, illustrated is an example, non-limiting embodiment of a block diagram 300 showing a mobile network architecture with an SDN controller 304 in accordance with various aspects described herein.

In the embodiment, shown in FIG. 3, all of the core network elements in the control plane are virtualized elements, e.g., network function virtualizations, in this case, the PCRF 306. PCRF 306 can be a sub instantiation of an NFV inside SDN controller 304 and can perform traditional functions such as controlling the QoS and other information (priorities, bandwidths, etc.) that manages IP flows carrying a particular application (such as voice, video, messaging, etc.). The PCRF VNF 306 is not a physical server element, but resides in software or in the cloud. Accordingly, SDN controller 304 can provide the traffic management for data sent to and from the PGW 308 and the mobility core network 302 even though PGW 308 may be a traditional, non-virtualized server element.

In the control plane, PCRF VNF 306 can provide traffic management control for packets received from the mobile device via the eNodeB at the PGW 308, and can also provide traffic management for packets forwarded on to other NFVs or the external packet network. The PCRF 306 can apply rules and policies based on user related information and subscription material available in a policy database 310.

In an embodiment, the PCRF VNF 306 and the SDN controller 304 can perform traffic management functions such as route modification for transmission routes of data sent to the external packet network and Differentiated Services Code Point ("DSCP") mapping based on the service related information such as the predetermined QoS levels per user/application. In an embodiment, the traffic management functions performed by the PCRF VNF 306 or the SDN controller 304 on a first set of data received at a PGW 308 sent from a mobile device include routing data based on subscription information associated with profile information about the mobile device or a user account associated with the mobile device.

The routing data can include classifying a packet classification and performing route optimization. In another embodiment, the PCRF VNF 306 can perform a second traffic management function on traffic between the PGW 308 and the external packet network including performing quality of service control based at least in part on subscription information associated with profile information associated with the mobile device. The quality of service control can also be based on an application associated with the packets of data. For instance, if a set of data is related to voice applications, the packet can have a specified QoS defined by the policy database 310, and PCRF VNF 306 can ensure that the QoS level is maintained by the PGW 308.

Figure 4:
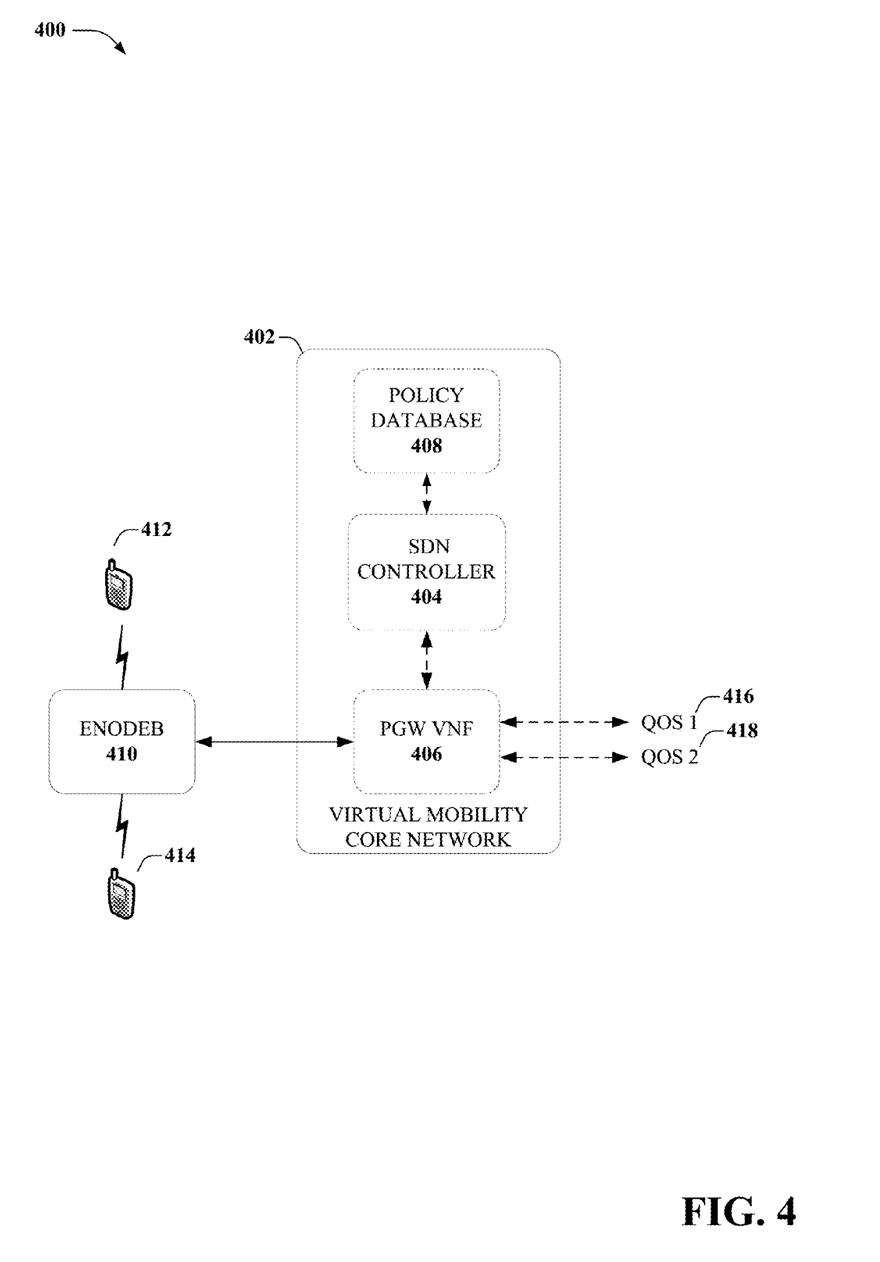
FIG. 4 is an example, non-limiting embodiment of a block diagram showing a mobile network architecture with an SDN controller that provides data traffic management for mobile devices in accordance with various aspects described herein.

Turning now to FIG. 4, illustrated is a block diagram 400 showing a mobile network architecture with an SDN controller 404 that provides data traffic management for mobile devices in accordance with various aspects described herein.

In the embodiment, shown in FIG. 4, the user plane network element in the virtual mobility core network 402 is a virtualized PGW VNF 406. PGW VNF 406 performs the same or similar tasks such as a regular PGW, (e.g., route and transmit packets from one or more of mobile devices 412 and 414 via the eNodeB 410, to an external packet network.) but the PGW VNF 406 is not a physical server element, but resides in software or in the cloud. Accordingly, SDN controller 404 can provide the traffic management for data sent to and from the PGW VNF 406.

In the control plane, SDN controller 404 can provide traffic management control for packets received from mobile devices 412 and 414 and apply different QoS levels (e.g., QoS 1 416 or QoS 2 418) based on the mobile device from which the packets originated, subscription information associated with mobile devices 412 and 414 and/or applications that are being run by mobile devices 412 and 414. The SDN controller 404 can also provide traffic management for packets forwarded on to other NFVs or the external packet network. The SDN controller 404 can apply rules and policies based on user related information and subscription material available in a policy database 408.

In an embodiment, the SDN controller 404 can perform traffic management functions such as route modification for transmission routes of data sent to the external packet network and DSCP mapping based on the service related information. In an embodiment, the traffic management functions performed by the SDN controller 404 on a first set of data received at a PGW VNF 406 sent from mobile device 412 and/or 414 can include routing data based on subscription information associated with profile information about the mobile devices or a user account associated with the mobile devices.

The routing data can include classifying a packet classification and performing route optimization. In another embodiment, the SDN controller 404 can perform a second traffic management function on traffic between the PGW VNF 406 and the external packet network including quality of service control based at least in part on subscription information associated with profile information associated with the mobile device. The quality of service control can also be based on an application associated with the packets of data. For instance, if a set of data is related to voice applications, the packet can have a specified QoS defined by the policy database 408 (e.g. QoS 1 416 or QoS 2 418), and SDN controller 404 can ensure that the packet is managed accordingly.

Figure 5:
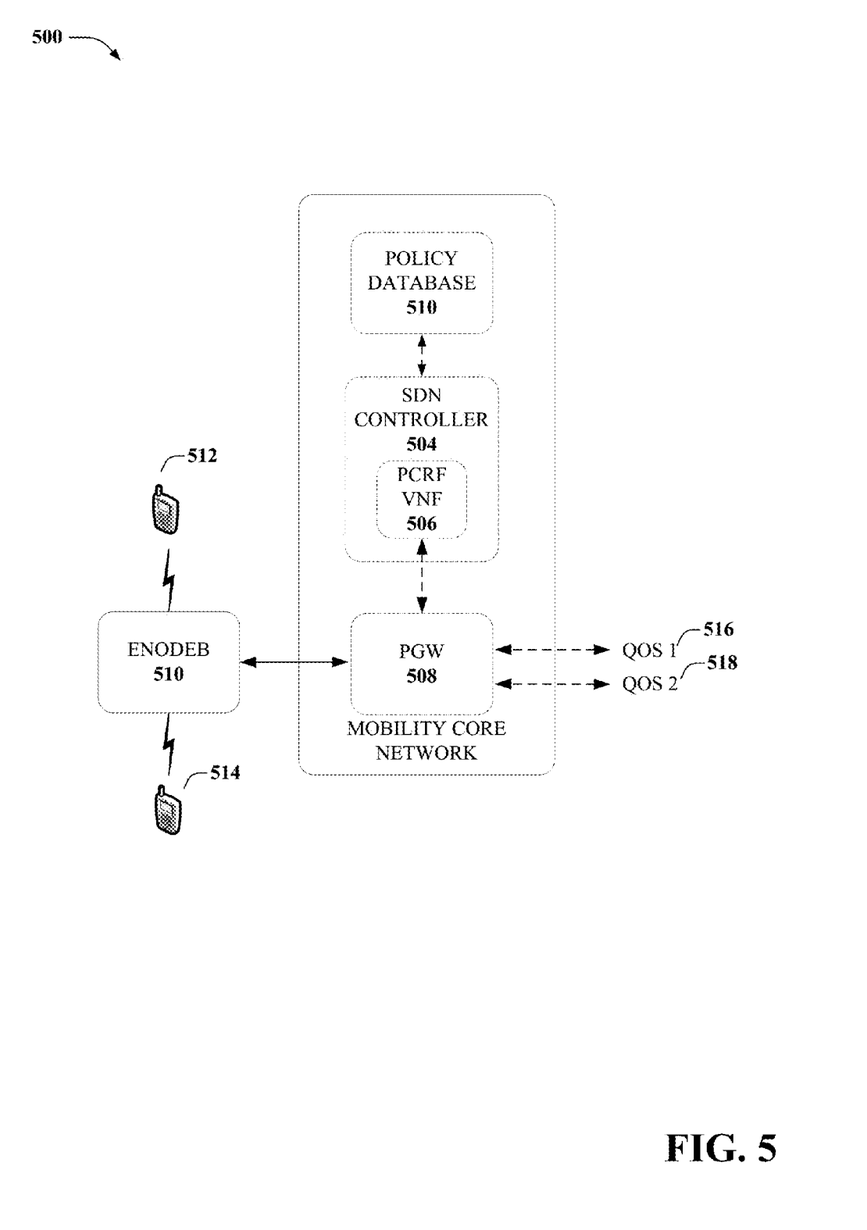
FIG. 5 is an example, non-limiting embodiment of a block diagram showing a mobile network architecture with an SDN controller that provides data traffic management for mobile devices in accordance with various aspects described herein.

Turning now to FIG. 5, illustrated is of a block diagram 500 showing a mobile network architecture with an SDN controller 504 with a virtualized PGW VNF 506 that provides data traffic management for mobile devices in accordance with various aspects described herein.

In the embodiment, shown in FIG. 4, the control plane network element in the mobility core network 502 is a virtualized PCRF VNF 506. PCRF VNF 406 performs the same or similar tasks such as a regular PCRF, (e.g., controlling the QoS and other information that manages IP flows that carries a particular application).

In the control plane, PCRF VNF 506 can provide traffic management control for packets received from mobile devices 512 and 514 via eNodeB 510 and apply different QoS levels (e.g., QoS 1 516 or QoS 2 518) based on the mobile device from which the packets originated, subscription information associated with mobile devices 512 and 514 and/or applications that the packets are associated with. The PCRF VNF 506 can also provide traffic management for packets forwarded on to other NFVs or the external packet network. The PCRF VNF 506 can apply rules and policies based on user related information and subscription material available in a policy database 510.

In an embodiment, the PCRF VNF 506 can perform traffic management functions such as route modification for transmission routes of data sent to the external packet network and DSCP mapping based on the service related information. In an embodiment, the traffic management functions performed by the PCRF VNF 506 on a first set of data received at a PGW 508 sent from mobile device 512 and/or 514 can include routing data based on subscription information associated with profile information about the mobile devices or a user account associated with the mobile devices.

The routing data can include classifying a packet classification and performing route optimization. In another embodiment, the PCRF VNF 506 can perform a second traffic management function on traffic between the PGW 508 and the external packet network including quality of service control based at least in part on subscription information associated with profile information associated with the mobile device. The quality of service control can also be based on an application associated with the packets of data. For instance, if a set of data is related to voice applications, the packet can have a specified QoS defined by the policy database 510 (e.g. QoS 1 516 or QoS 2 518), and PCRF VNF 506 can ensure that the packet is managed accordingly.

Figure 6:
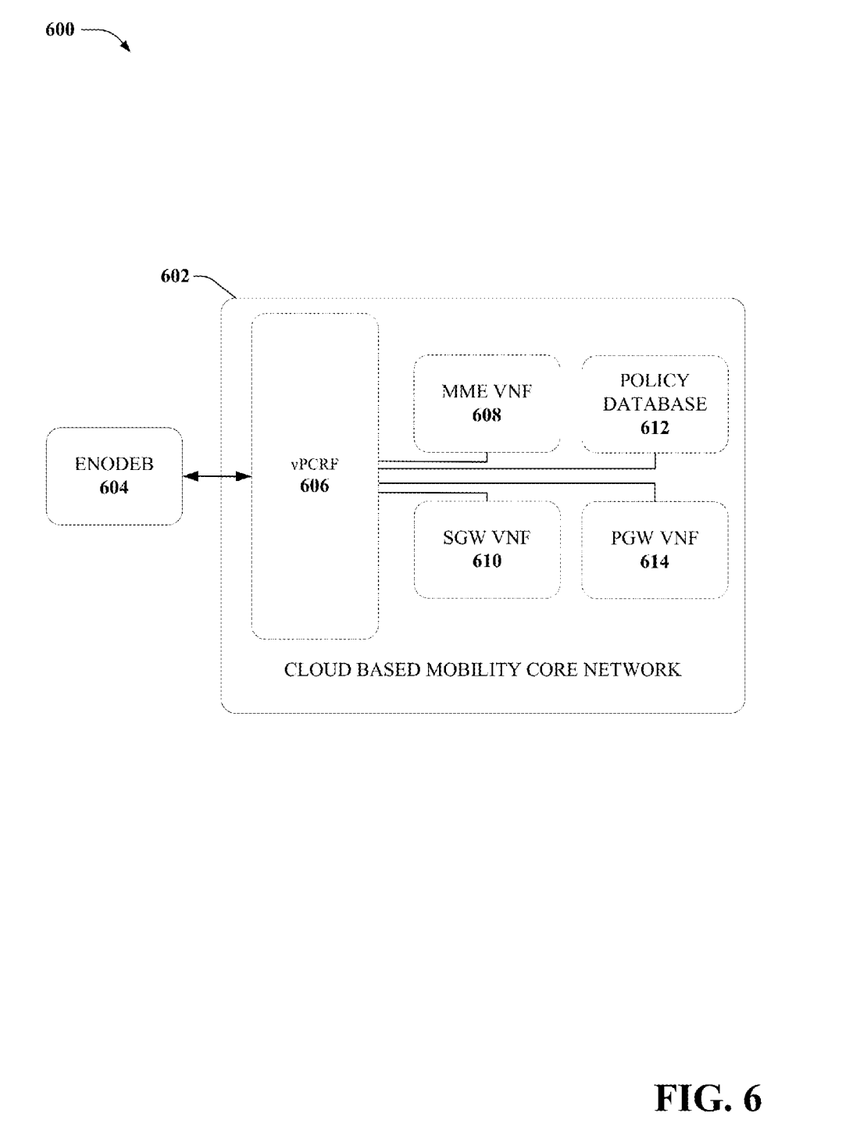
FIG. 6 is an example, non-limiting embodiment of a block diagram showing a mobile network architecture with an SDN controller in accordance with various aspects described herein.

Turning now to FIG. 6, illustrated is a block diagram 600 showing a cloud based mobility core network 602 with a virtual PCRF 606 in accordance with various aspects described herein. An eNodeB 604 can communicate with a cloud based mobility core network 602 that has virtualized network elements such as MME VNF 608, Policy database 612, SGW VNF 610, and PGW VNG 614. The virtual PCRF 606 manages the control plane function for all communications sent between the eNodeB 604 and the virtualized network elements 608, 612, 610, and 614.

Figure 7:
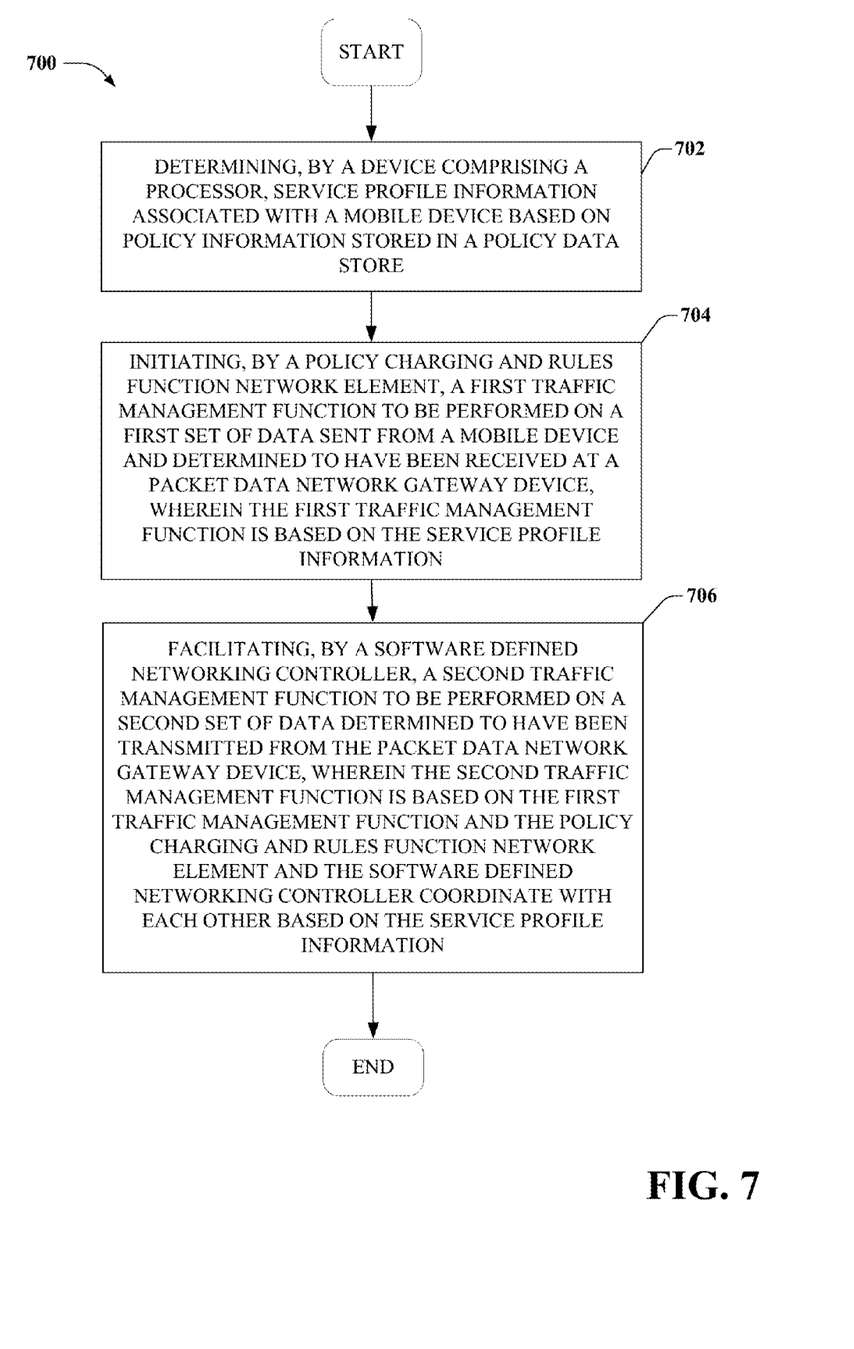
FIG. 7 is an example, non-limiting embodiment of a method for performing traffic management with software defined networking in accordance with various aspects described herein.
Figure 8:
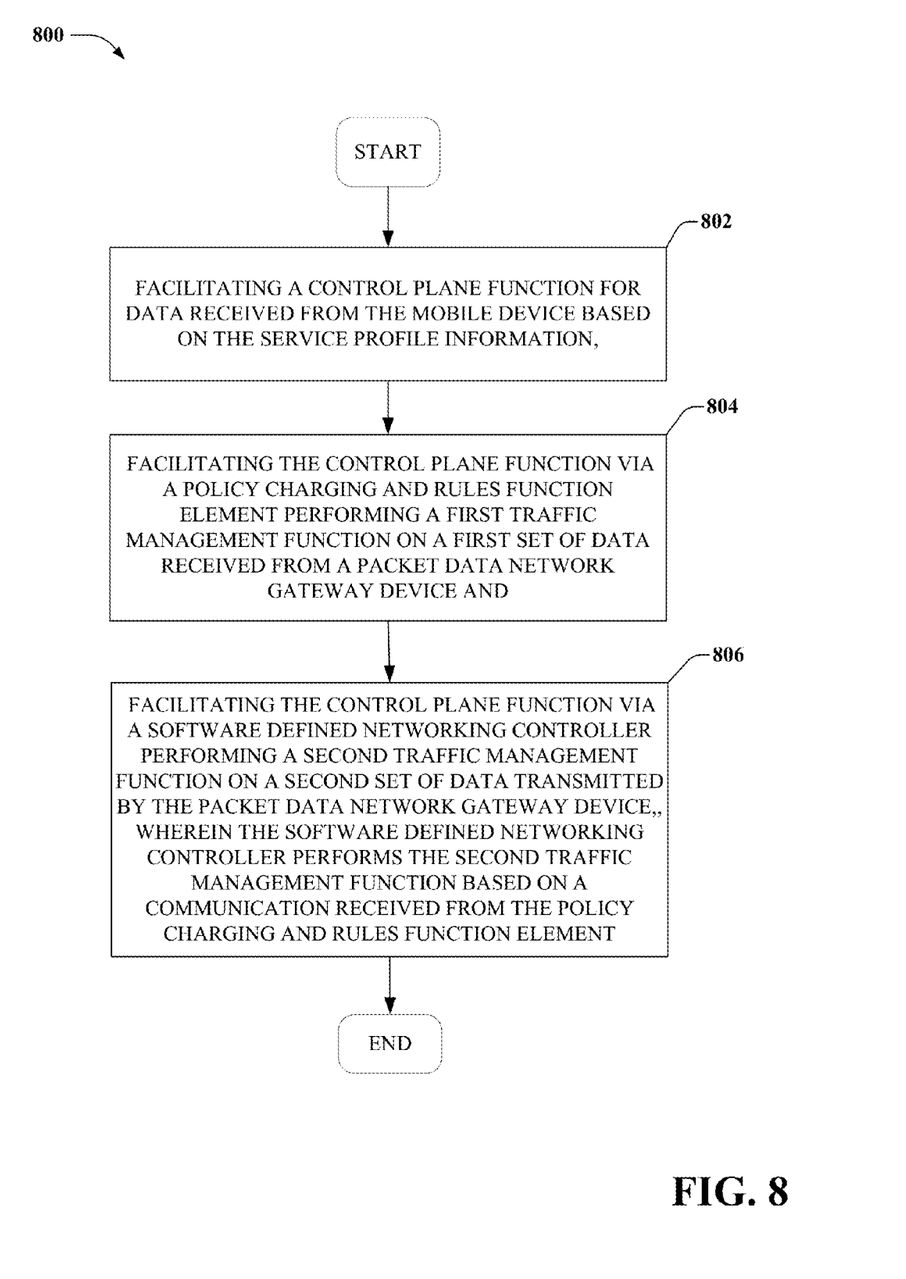
FIG. 8 is an example, non-limiting embodiment of a method for performing traffic management with software defined networking in accordance with various aspects described herein.

FIGS. 7-8 illustrate a process in connection with the aforementioned systems. The processes in FIGS. 7-8 can be implemented for example by the systems in FIGS. 1-6. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates a flow diagram of an example, non-limiting embodiment of a method 700 for performing traffic control management. At 702, the method comprises determining, by a device comprising a processor, service profile information associated with a mobile device based on policy information stored in a policy data store (e.g., by an SDN controller looking up a policy or subscription information in the policy data store). At 704 the method includes initiating, by a policy charging and rules function network element, a first traffic management function to be performed on a first set of data sent from a mobile device and determined to have been received at a packet data network gateway device (e.g., by PCRF 104 or SDN controller 206), wherein the first traffic management function is based on the service profile information.

At 706, the method can include facilitating, by a software defined networking controller, a second traffic management function to be performed on a second set of data determined to have been transmitted from the packet data network gateway device, wherein the second traffic management function is based on the first traffic management function and the policy charging and rules function network element and the software defined networking controller coordinate with each other based on the service profile information (e.g., by SDN controller 108 or 206).

FIG. 8 illustrates a flow diagram of an example, non-limiting embodiment of a method 800 for performing traffic control management. At 802, the method comprises facilitating a control plane function for data received from the mobile device based on the service profile information. At 804 the method comprises facilitating the control plane function via a policy charging and rules function element performing a first traffic management function on a first set of data received from a packet data network gateway device.

At 806 the method can comprise facilitating the control plane function via a software defined networking controller performing a second traffic management function on a second set of data transmitted by the packet data network gateway device, wherein the software defined networking controller performs the second traffic management function based on a communication received from the policy charging and rules function element.

Figure 9:
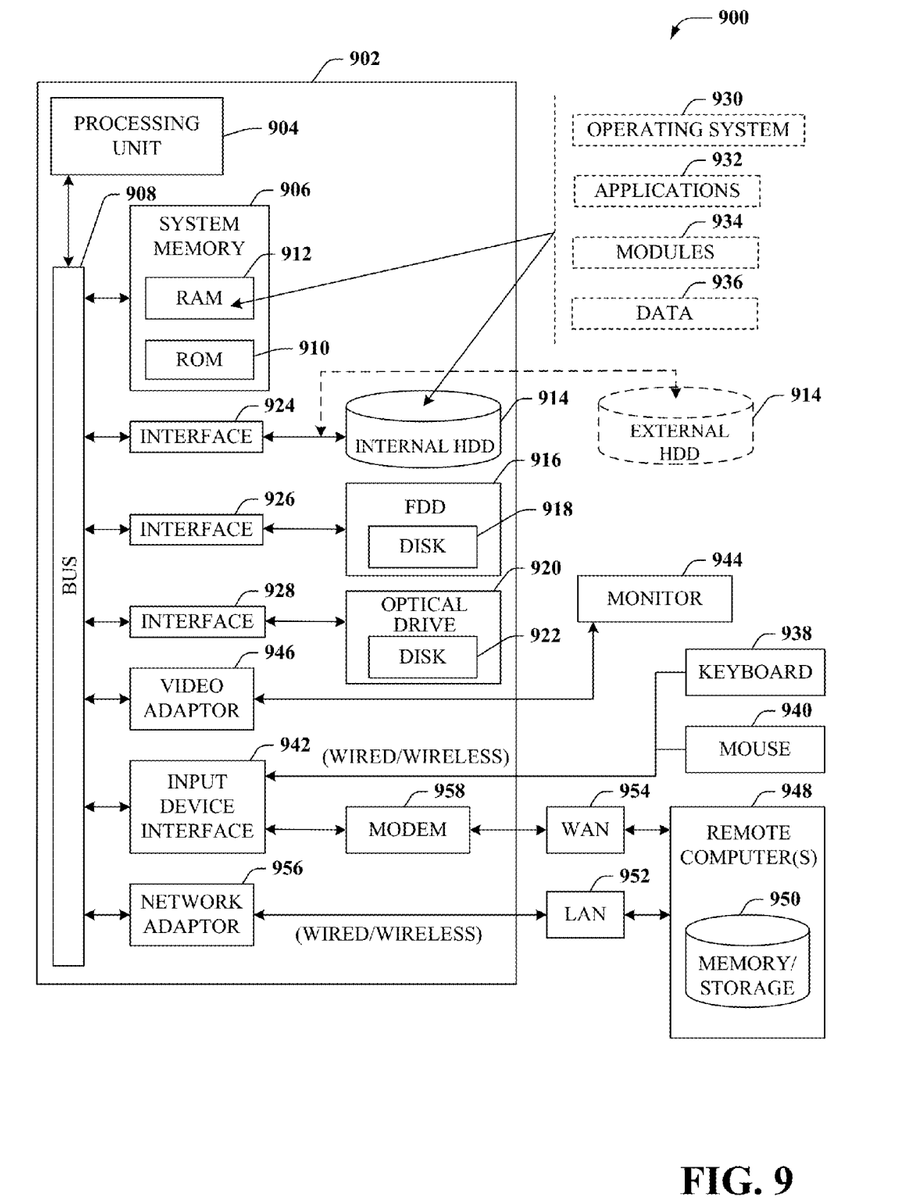
FIG. 9 is a block diagram of an example, non-limiting embodiment of a computing environment in accordance with various aspects described herein.

Referring now to FIG. 9, there is illustrated a block diagram of a computing environment in accordance with various aspects described herein. For example, in some embodiments, the computer can be or be included within the radio repeater system disclosed in any of the previous systems 200, 300, 400, 500, 600 and/or 700.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an infrared (IR) remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a universal serial bus (USB) port, an IR interface, etc.

A monitor 944 or other type of display device can be also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also include a wireless AP disposed thereon for communicating with the wireless adapter 956.

When used in a WAN networking environment, the computer 902 can include a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 BaseT wired Ethernet networks used in many offices.

In an embodiment of the subject application, the computer 902 can provide the environment and/or setting in which one or more of the core mobility networks disclosed in FIGS. 1-6 can be operated from. For instance, the virtual PCRFs and SDN controllers disclosed herein can be applications 932 stored in hard drive 914 and executed by processing unit 904.

Figure 10:
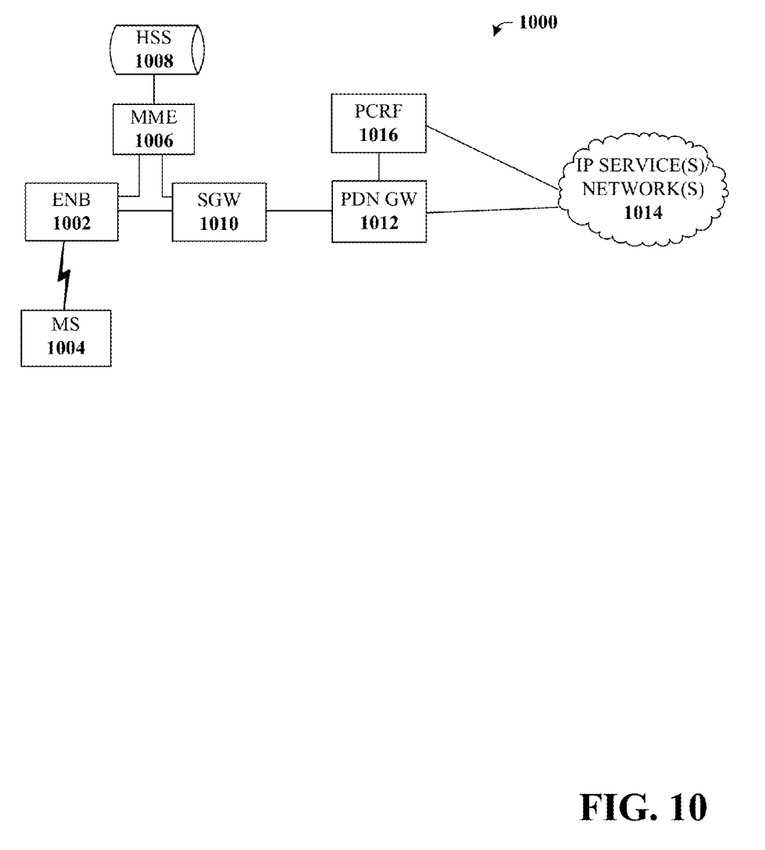
FIG. 10 illustrates a Long Term Evolution ("LTE") network architecture that can employ the disclosed architecture

FIG. 10 illustrates a high-level block diagram that depicts an example LTE network architecture 1000 that can employ the disclosed communication architecture. The evolved RAN for LTE consists of an eNodeB (eNB) 1002 that can facilitate connection of MS 1004 to an evolved packet core (EPC) network. In one aspect, the MS 1004 is physical equipment or Mobile Equipment (ME), such as a mobile phone or a laptop computer that is used by mobile subscribers, with a Subscriber identity Module (SIM). The SIM is associated with a CTN, an International Mobile Subscriber Identity (IMSI), IMEI, and/or MSISDN, which is a unique identifier of a subscriber. The MS 1004 includes an embedded client that receives and processes messages received by the MS 1004. As an example, the embedded client can be implemented in JAVA. It is noted that MS 1004 can be substantially similar mobile devices 412 and 414 or 512 and 514.

The connection of the MS 1004 to the evolved packet core (EPC) network is subsequent to an authentication, for example, a SIM-based authentication between the MS 1004 and the evolved packet core (EPC) network. In one aspect, the MME 1006 provides authentication of the MS 1004 by interacting with the HSS 1008. The HSS 1008 contains a subscriber profile and keeps track of which core network node is currently handling the subscriber. It also supports subscriber authentication and authorization functions (AAA). In networks with more than one HSS 1008, a subscriber location function provides information on the HSS 1008 that contains the profile of a given subscriber.

As an example, the eNB 1002 can host a PHYsical (PHY), Medium Access Control (MAC), Radio Link Control (RLC), and Packet Data Control Protocol (PDCP) layers that include the functionality of user-plane header-compression and encryption. In addition, the eNB 1002 can implement at least in part Radio Resource Control (RRC) functionality (e.g., radio resource management, admission control, scheduling, cell information broadcast, etc.). The eNB 1002 can be coupled to a serving gateway (SGW) 1010 that facilitates routing of user data packets and serves as a local mobility anchor for data bearers when the MS 1004 moves between eNBs. In addition, the SGW 1010 can act as an anchor for mobility between LTE and other 3GPP technologies (GPRS, UMTS, etc.). When MS 1004 is in an idle state, the SGW 1010 terminates a downlink (DL) data path and triggers paging when DL data arrives for the MS 1004. Further, the SGW 1010 can perform various administrative functions in the visited network such as collecting information for charging and lawful interception.

In one aspect, the SGW 1010 can be coupled to a Packet Data Network Gateway (PDN GW) 1012 that provides connectivity between the MS 1004 and external packet data networks such as IP service(s)/network(s) 1014. Moreover, the PDN GW 1012 is a point of exit and entry of traffic for the MS 1004. It is noted that the MS 1004 can have simultaneous connectivity with more than one PDN GW (not shown) for accessing multiple PDNs.

The PDN GW 1012 performs IP address allocation for the MS 1004, as well as QoS enforcement and implements flow-based charging according to rules from a Policy Control and Charging Rules Function (PCRF) 1016. The PCRF 1016 can facilitate policy control decision-making and control flow-based charging functionalities in a Policy Control Enforcement Function (PCEF), which resides in the PDN GW 1012. The PCRF 1016 can store data (e.g., QoS class identifier and/or bit rates) that facilitates QoS authorization of data flows within the PCEF. In one aspect, the PDN GW 1012 can facilitate filtering of downlink user IP packets into the different QoS-based bearers and perform policy enforcement, packet filtering for each user, charging support, lawful interception and packet screening. Further, the PDN GW acts as the anchor for mobility between 3GPP and non-3GPP technologies such as WiMAX and 3GPP2 (CDMA 1X and EvDO). Although a LTE network architecture 1000 is described and illustrated herein, it is noted that most any communication network architecture can be utilized to implement the disclosed embodiments.

In order to provide a context for the various aspects of the disclosed subject matter, FIGS. 9 and 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory (see below), non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
determining service profile information associated with a mobile device based on policy information stored in a policy data store;
managing a control plane function for data received from the mobile device based on the service profile information, wherein the managing the control plane function is facilitated by a software defined networking controller performing a first traffic management function on first data received by a packet data network gateway device and performing a second traffic management function on second data transmitted by the packet data network gateway device; and
based on a quality of service, modifying, according to the second traffic management function, a route associated with a transport of the second data.

2. The system of claim 1, wherein the second traffic management function comprises routing the second data based on subscription information associated with profile information related to the mobile device.

3. The system of claim 2, wherein the routing the second data comprises classifying a packet with a classification and performing a route modification for routes for transmission of the second data.

4. The system of claim 1, wherein the second traffic management function comprises maintaining a quality of service level of the second data based on subscription information associated with profile information related to the mobile device.

5. The system of claim 1, wherein the second traffic management function comprises maintaining a quality of service level of the second data based on an application associated with the first and second sets of data.

6. The system of claim 1, wherein the service profile information comprises a rule and subscription information related to the mobile device.

7. The system of claim 1, wherein the software defined networking controller comprises a virtualized policy charging and rules function network element that performs the first traffic management function.

8. The system of claim 1, wherein the packet data network gateway device is a virtualized packet data network gateway device.

9. A machine-readable storage medium, comprising executable instructions that, when executed by a processor, facilitate performance of operations, comprising:

determining service profile information associated with a mobile device based on policy information stored in a policy data store; and facilitating a control plane function for data received from the mobile device based on the service profile information, wherein the facilitating the control plane function uses a policy charging and rules function element that performs a first traffic management function on first data being determined to have been received by a packet data network gateway device and, using a software defined networking controller, performs a second traffic management function on second data being determined to have been transmitted by the packet data network gateway device, wherein the software defined networking controller performs the second traffic management function based on a communication received from the policy charging and rules function element; and based on a quality of service, modifying, by performance of the first traffic management function, a route associated with a transport of the first data.

10. The machine-readable storage medium of claim 9, wherein the second traffic management function comprises routing the second data based on subscription information associated with profile information applicable to the mobile device.

11. The machine-readable storage medium of claim 10, wherein the routing the second data comprises classifying a packet with a defined classification and performing a route modification of routes for transmission of the second data.

12. The machine-readable storage medium of claim 9, wherein the second traffic management function comprises maintaining a quality of service level of the second data based on subscription information associated with profile information applicable to the mobile device and an application associated with the mobile device.

13. The machine-readable storage medium of claim 9, wherein the service profile information comprises a rule and subscription information related to the mobile device.

14. The machine-readable storage medium of claim 9, wherein the policy charging and rules function network element is a virtualized element of the software defined networking controller.

15. The machine-readable storage medium of claim 9, wherein the packet data network gateway device is a virtualized packet data network gateway device.

16. The machine-readable storage medium of claim 9, wherein the policy charging and rules function element comprises a virtualized policy charging and rules function element that provides control plane management for a virtualized mobile management entity, a virtualized serving gateway device, a virtualized packet data gateway device, and the policy data store.

17. A method, comprising:

determining, by a device comprising a processor, service profile information associated with a mobile device based on policy information stored in a policy data store;

initiating, by a policy charging and rules function network element of the device, a first traffic management function to be performed on first data sent from the mobile device and determined to have been received at a packet data network gateway device, wherein the first traffic management function is based on the service profile information;

facilitating, by a software defined networking controller of the device, a second traffic management function to be performed on a second data determined to have been transmitted from the packet data network gateway device, wherein the second traffic management function is based on the first traffic management function and the policy charging and rules function network element and the software defined networking controller coordinate with each other based on the service profile information; and based on the first traffic management function being performed and a quality of service, modifying, by the device, a route associated with a transport of the first data.

18. The method of claim 17, further comprising:

routing, by the software defined networking controller, the second data based on subscription information related to profile information associated with the mobile device.

19. The method of claim 17, further comprising:

performing, by the software defined networking controller, quality of service control based on an application associated with the mobile device.

20. The method of claim 17, further comprising:

performing, by the software defined networking controller, quality of service control based on subscription information related to profile information associated with the device.

* * * * *